US005755653A

United States Patent [19]

Nishida

[11] Patent Number: 5,755,653

[45] Date of Patent: May 26, 1998

[54] METHOD OF EXCHANGING DIE SETS IN A PRESS SYSTEM

[75] Inventor: Kenji Nishida, Komatsu, Japan

[73] Assignee: Komatsu Ltd., Tokyo, Japan

[21] Appl. No.: 737,857

[22] PCT Filed: May 30, 1995

[86] PCT No.: PCT/JP95/01045

§ 371 Date: Nov. 15, 1996

§ 102(e) Date: Nov. 15, 1996

[87] PCT Pub. No.: WO95/32821

PCT Pub. Date: Dec. 7, 1995

[30] Foreign Application Priority Data

May 30, 1994 [JP] Japan .................................... 6-116183

[51] Int. Cl.[6] .................................................. B23Q 3/155

[52] U.S. Cl. ................................ 483/1; 72/446; 100/918; 483/28

[58] Field of Search .................................... 483/1, 28, 29; 100/918; 72/448, 446; 83/563

[56] References Cited

U.S. PATENT DOCUMENTS

| | | | |
|---|---|---|---|
| 4,614,108 | 9/1986 | Bolle et al. | 72/446 |
| 4,995,255 | 2/1991 | Noda | 72/446 |
| 5,040,403 | 8/1991 | Henderson et al. | 72/448 X |
| 5,063,648 | 11/1991 | Yonezawa et al. | 483/28 X |

FOREIGN PATENT DOCUMENTS

| | | | |
|---|---|---|---|
| 57-109533 | 7/1982 | Japan . | |
| 181447 | 10/1983 | Japan | 72/448 |
| 62-8896 | 3/1987 | Japan . | |
| 62-142429 | 9/1987 | Japan . | |
| 5-10987 | 3/1993 | Japan . | |
| 5-15435 | 4/1993 | Japan . | |

*Primary Examiner*—William R. Briggs
*Attorney, Agent, or Firm*—Frishauf, Holtz, Goodman, Langer & Chick

[57] ABSTRACT

There is disclosed a method of exchanging die sets in a press system. First, a state is established in which a die set having been used by the press system is held with a die holder means provided to a slide of the press system and is lifted up by the said slide. In this state, into an interior of the press system a carrier vehicle is transported having a first space in which a die set to be used next by the press system having been and a second space capable of accepting the said used die set, which is then dislodged from the said slide and is mounted on the carrier vehicle. Thereafter, the carrier vehicle is displaced to such a place that the said die set to be used next may be kept located below the said slide. Then, a state is established in which the said die set to be used next is held by the die holder means and is lifted up by the said slide. Thereafter, out of the interior of the press system, the said carrier vehicle is transported having the said used die set mounted thereon. Then, the final step of the method resides in lowering the said slide, and securing a lower die and an upper die of the said die set to be used next, upon a bed of the said press system and to a lower surface of the said slide thereof, respectively.

2 Claims, 11 Drawing Sheets

METHOD OF EXCHANGING DIE SETS IN A PRESS SYSTEM

TECHNICAL FIELD

The present invention relates to a press die exchanging method in which a series of press die sets are successively exchanged in a press system by using one or more carrier vehicles.

BACKGROUND ART

In a conventional press system such as a transfer press, in order to facilitate an exchange of die sets, it has been customary to provide the press system with a moving bolster that is designed to be capable of having a die set introduced into and then removed from the interior of the press system.

For example, in Japanese Unexamined Utility Model Publication No. Sho 62-142,429, there is disclosed a transfer press in which a plurality of moving bolsters are provided within a press system, and in which each time die sets are to be exchanged, such moving bolsters along with die sets having been used in a preceding pressing stage are conveyed out of the interior of the press system while the remaining or separate standby moving bolsters are conveyed along with die sets next to be used into the interior of the press system, thereby exchanging die sets having been used with die sets to be used in a next pressing stage within the interior of the press system.

Also, it is seen that in a transfer press as, for example, disclosed by Japanese Examined Utility Model Publication No. Hei 5-15,435 a plurality of moving bolsters are also included as capable of being introduced into and removed from the interior of the press system. In this case, if the moving bolsters received in the interior of the press system are interspaced with a reduced distance, an attempt have been made to reduce the width of an upright column of the press system to be less than the spacing between the moving bolsters so that when the moving bolsters are conveyed out of the interior of the press system, they may have no interference with any upright column within of the press system.

It has been noted, however, that a conventional press system that is provided with a moving bolster in any manner as in the above mentioned prior art, does require such a moving bolster as being not only rigid but also large sized in order for a heavy forming weight imposed on a die set to be supported by a bed of the press system through the moving bolster.

To this end, a comparison can be made with a case in which a die set is installed directly upon the press bed. The use of a moving bolster will make the entire height of the press system higher by the height of the moving bolster, thus making the entire press system enlarged in size and, as a result, requiring a building that is elevated in height sufficient to house the enlarged press system. This is certainly uneconomical.

Also, if the press system is increased in its total height, it follows that it will be reduced in its rigidity, thus developing such inconveniences as a drop in processing accuracy and the likelihood of a vibration to be generated.

Further, a moving bolster, which entails a traveling system for it to be self-propelled and a means for a power supply needed to the traveling system, will have to be complicated in structure and highly costly. In addition, the press system with a moving bolster necessitates subsidiary facilities such as a means for displacing the moving bolster up and down within the press system and a means for clamping the moving bolster onto the press bed, and hence must become more costly than is more convenient.

Accordingly, the present invention has been made to eliminate these inconveniences, and has for its generic object to provide a method of exchanging die sets in a press system, which method enables die sets to be exchanged without having to use a moving bolster, enhances the rigidity of the press system and allows a press forming to be performed with a high precision, while permitting a building in which the entire press system is installed to be lower in its height and further rendering the entire press system installation less expensive.

SUMMARY OF THE INVENTION

In order to achieve the object mentioned above, there is provided in accordance with the present invention, in a first general form of embodiment thereof, a method of exchanging die sets in a press system, characterized in that it comprises the steps of: establishing a state in which a die set having been used by the press system is held with a die holder means provided to a slide of the press system and is lifted by the said slide; in the said state, transporting into an interior of the press system a carrier vehicle having a first space in which a die set to be used next by the press system and having a second space capable of accepting the said used die set for mounting on the said carrier vehicle; dislodging the said used die set from the said slide and mounting it on said carrier vehicle; thereafter, displacing the said carrier vehicle to such a place that the said die set to be used next may be kept located below the said slide; establishing a state in which the said die set to be used next is held by the said die holder means and is lifted up by the said slide; thereafter, transporting out of the interior of the press system the said carrier vehicle having the said used die set mounted thereon; and thereafter, lowering the said slide, and securing a lower die and an upper die of the said die set to be used next, upon a bed of the said press system and to a lower surface of the said slide thereof, respectively.

The present invention also provides, in a second general form of embodiment thereof, a method of exchanging die sets in a press system, characterized in that it comprises the steps of: establishing a state in which a die set having been used by the press system is held with a die holder means provided to a slide of the press system and is lifted up by the said slide; in the said state, transporting into an interior of the press system a first carrier vehicle which is vacant; dislodging the said used die set from the said slide and mounting it on the said first carrier vehicle; transporting out of the interior of the press system the said first carrier vehicle having the said used die set mounted thereon; thereafter, transporting into the interior of the press system a second carrier vehicle having mounted thereon a die set to be used next by the press system; thereafter, establishing a state in which the said die set to be used next is held by the said die holder means and is lifted up by the said slide; thereafter, transporting the said second carrier vehicle out of the interior of the press system; and thereafter, lowering the said slide, and securing a lower die and an upper die of said die set to be used next, upon a bed of the said press system and to a lower surface of the said slide thereof, respectively.

According to either of the above mentioned general forms of embodiment of the present invention in which press die sets are exchanged by using one or more carrier vehicles in such a manner that a die set having been used by a press system may be conveyed out of an interior thereof and a die set to be used next by the press system may be conveyed into the interior thereof, it can be seen that it has become possible to exchange die sets in a press system without having to use one or more moving bolsters.

Since the press system can thereby be reduced in its total height by the height of a moving bolster, it can be seen that the present invention will enable the press system to be enhanced in its rigidity and, as a result, a press forming operation to be performed with an increased accuracy while allowing a building in which the entire press system is installed to be reduced in its total height, thus providing for remarkably enhanced economical results.

Also, the present invention thus makes it unnecessary to provide a large sized and heavy weighted moving bolster as well as such accessory facilities associated therewith as a means for displacing it up and down within the interior of the press system and a means for clamping it to a bed of the press system. As will readily be appreciated, this is able to largely reduce the entire cost of the press system and to bring about a marked improvement in its rigidity which in turn results in a reduction of possible vibrations during press forming operations and a diminishing of their accompanying noises.

Also, the ability to securely hold a press die directly upon a press bed, which represents another important advantage here, will ensure that any scrap which may evolve there can be exhausted through a scrap discharge outlet if formed therein, with which any scrap can readily be exhausted outside without resorting on a scrap shoot or the like.

Furthermore, the ability to transport a die set to a die set storage site and to exchange die sets with one or more carrier vehicles, which represents a still further important advantage here, will ensure an operation of die set exchange which can be carried out on a full automatic basis by providing a die set exchange unit at the die set storage site.

And yet, by virtue of the fact that during a press forming operation such one or more carrier vehicles should lie outside of the interior of the press system, thus making it unnecessary (here, rather inadequate) to hold it like a moving bolster in the interior of the press system, it is seen that any problem such as the inconvenience previously encountered that during the press forming operation a coolant or lubricating oil as would have been adherent to the moving bolster may drop on a path of travel thereof and may thus contaminate it will be effectively resolved.

Finally it should be pointed out that in addition to the configurations mentioned above, it might be hardly said that a plurality of die sets having been used by a press system be exchanged for a plurality of die sets set to be used next by the press system, respectively, at the same time.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but rather to facilitate an explanation and understanding thereof.

in the accompanying drawings.

BEST MODES FOR CARRYING OUT THE INVENTION

Hereinafter, suitable embodiments of the present invention with respect to a die set exchanging method will be set forth with reference to the accompanying drawings hereof.

A detailed explanation will now be given of a certain embodiment of the present invention with references to those drawings to which it is applicable.

Figure 1:
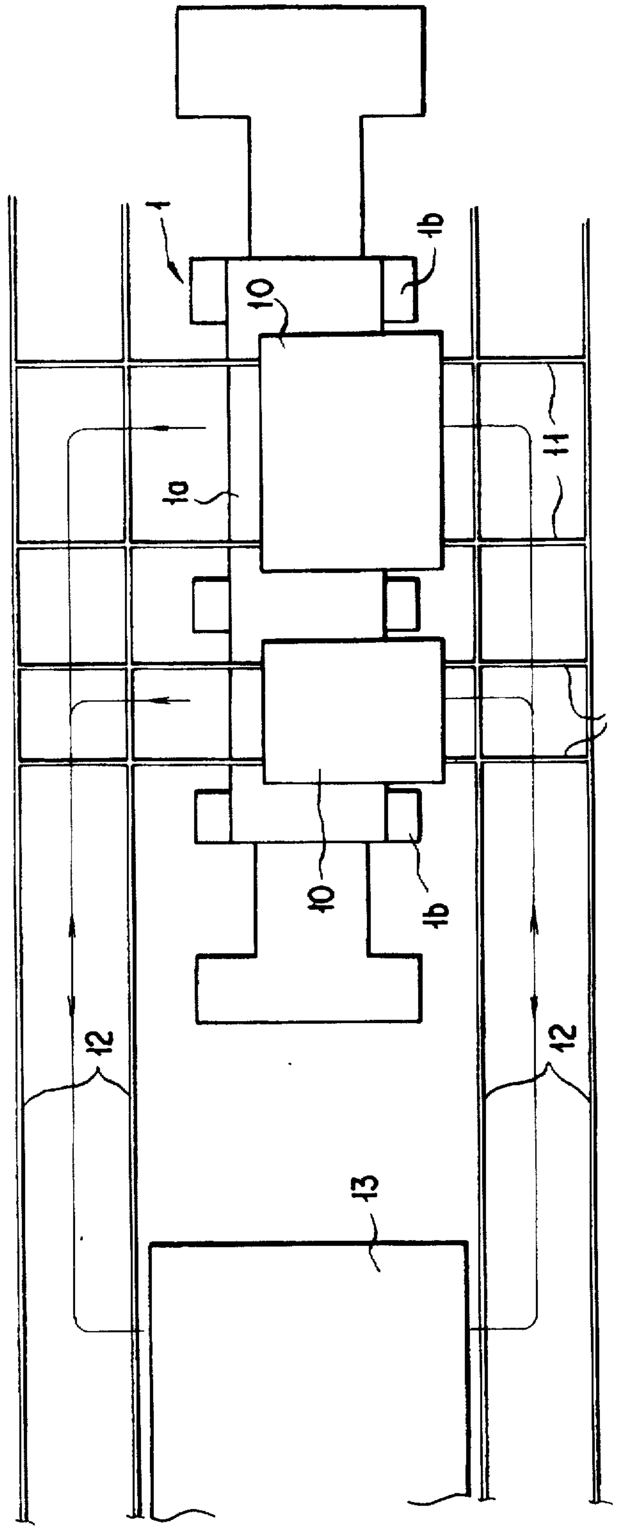
FIG. 1 is a top plan view of a transfer press which incorporates a certain embodiment of the die set exchanging method according to the present invention.
Figure 2:
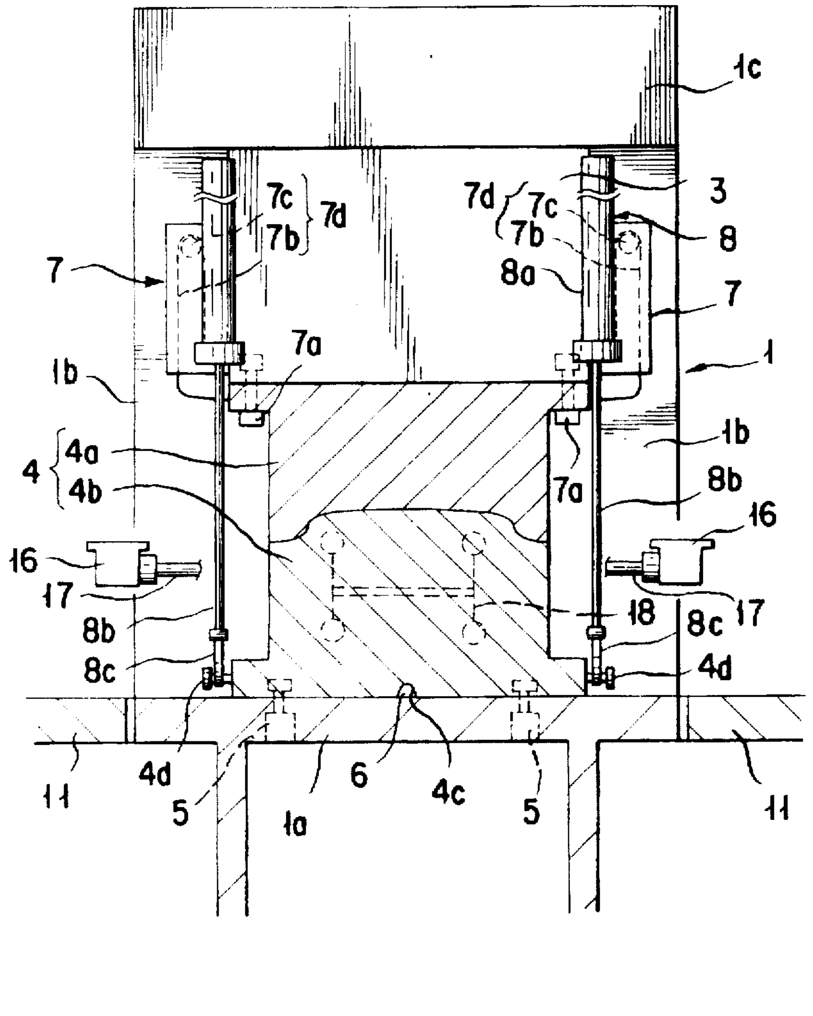
FIG. 2 is a cross sectional view of the transfer press that is shown in FIG. 1.

FIG. 1 shows a top plan view of a transfer press and FIG. 2 shows a cross sectional view thereof.

In the Figures, a press system is designated by 1 and includes a plurality of upright columns **1*b* which stand on a press bed 1*a*. The said upright columns 1*b* have their respective top ends on which is mounted a common crown 1*c* in which a slide drive mechanism (not shown) for vertically driving a slide 3** both upwards and downwards is housed.

A die set 4 which is transported or conveyed into an interior of the said press system 1 comprises an upper die **4*a* and a lower die 4*b*. The said press bed 1*a* of the press system 1 is formed therein with a plurality of lower die clampers 5 which serve to clamp the said lower die 4*b* upon the press bed 1*a* at a like plurality of locations. Before the clamp is so made, the said lower die 4*b* is adequately positioned upon the said press bed 1*a* by fitting a positioning projection 6, for example, a locater pin, key or the like positioning projection 6 formed on the press bed 1*a* in a positioning recess 4*c* formed in a lower surface area of the lower die 4*b***.

Also, the above mentioned slide 3 has at its two sides a pair of upper die clamp units 7 and 7 as well as a pair of die holders 8 and 8. The said clamp units 7 and 7 are designed to securely hold the said upper die **4*a* to the lower surface of the said slide 3, whereas the said die holders 8 and 8 are designed to hold die 4 and to suspend it integrally from the said slide 3**.

Each of the above mentioned upper die clamp units 7 and 7 comprises a hydraulic damper **7*a* that is displaceably attached to the lower surface of the said slide 3 by a feed mechanism 7*d* which in turn comprises a chain 7*b* and a drive source 71 therefor and which is attached to the side surface of the said slide 3. These components are provided to act together to securely hold the said upper die 4*a* to, and also to disengage it from, the lower surface of the said slide 3**.

Each of the above mentioned die holders 8 and 8 comprises a hydraulic cylinder **8*a* that is mounted to the side surface of the said slide 3, a piston rod 8*b* that extends downwards from the hydraulic cylinder 8*a* and a grasping mechanism 8*c* that is disposed at the lower end of the piston rod 8*b***.

Figure 3:
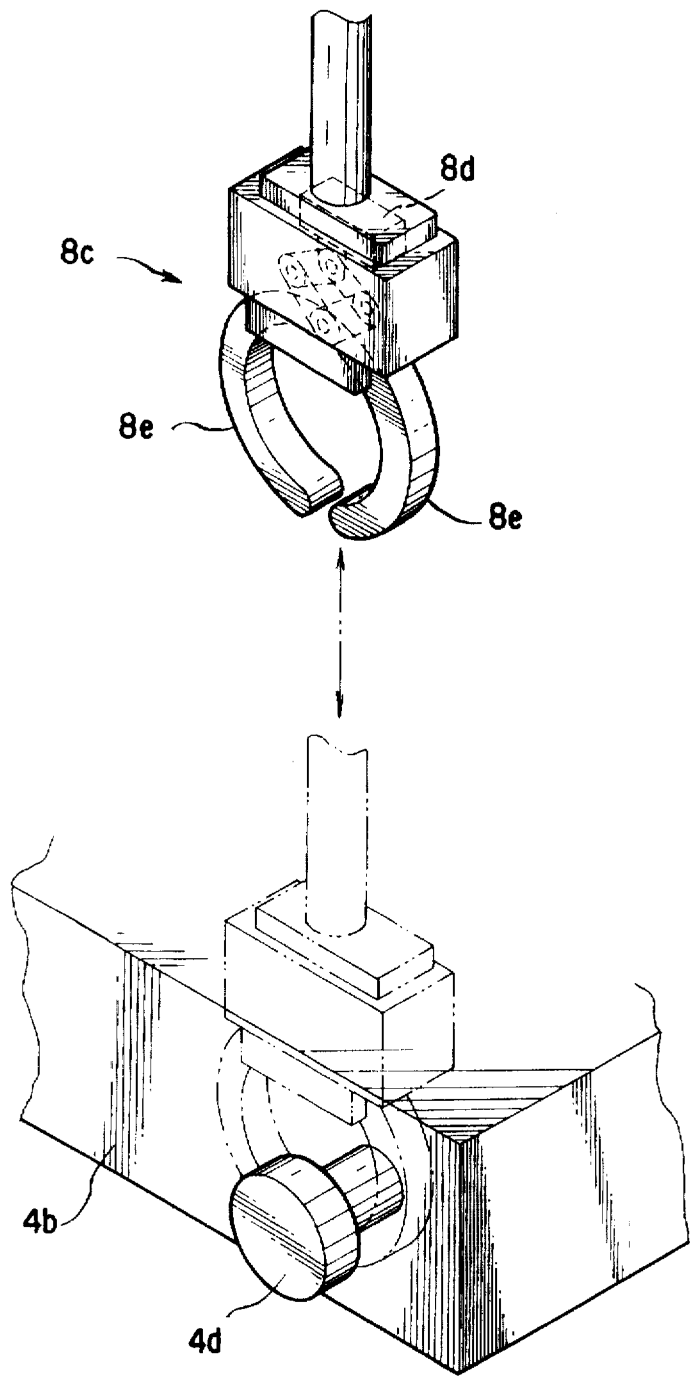
FIG. 3 is a perspective view of a grasping mechanism which is a part of a die holder in the transfer press that us shown in FIG. 1.

An example of the said grasping mechanism 8c is shown in FIG. 3 in which it comprises an actuator cylinder 8d and a pair of claw members 8e which are adapted to be opened and closed by the actuator cylinder 8d. Two such grasping mechanisms 8c and 8c in a pair are designed to grasp and release a pair of side suspension hooks 4 which are projected from two lower side surfaces of the said lower side 4b.

Figure 5:
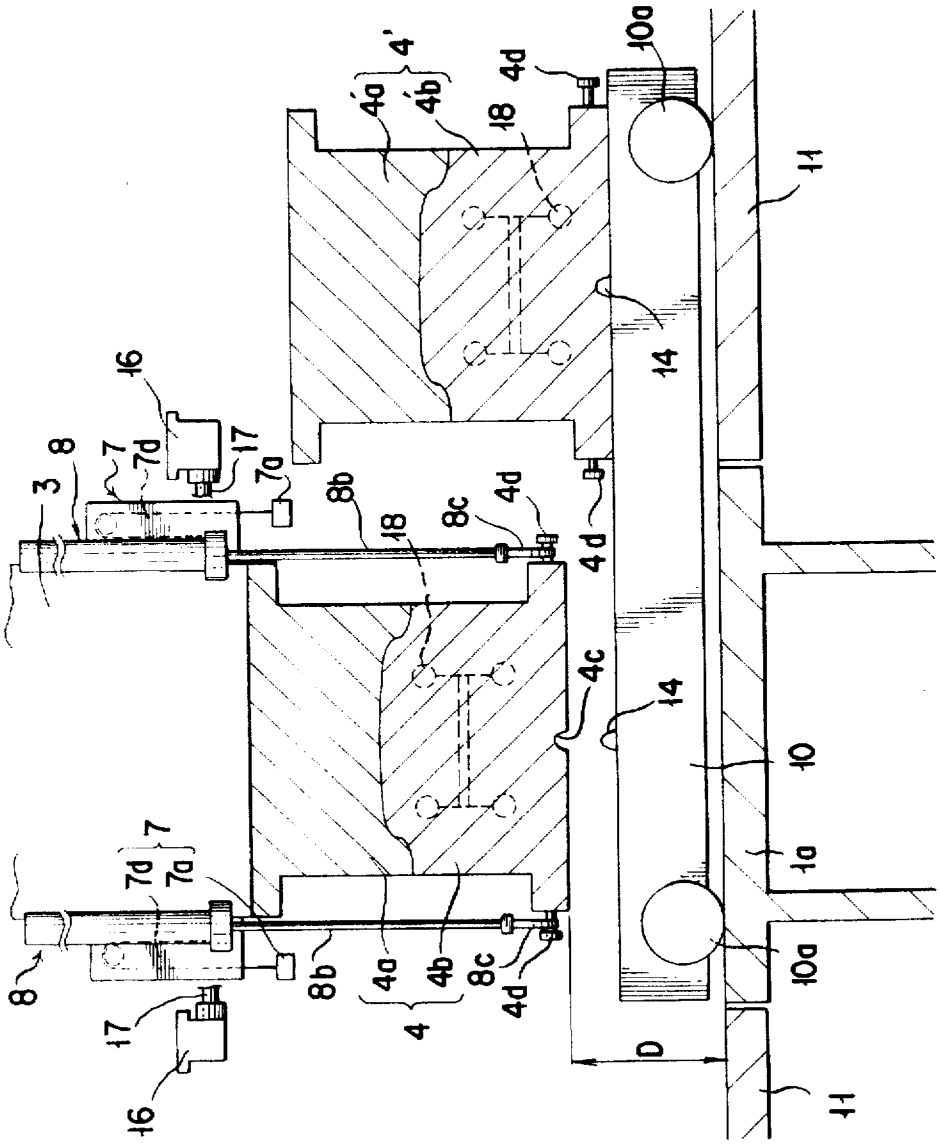
Figure 6:
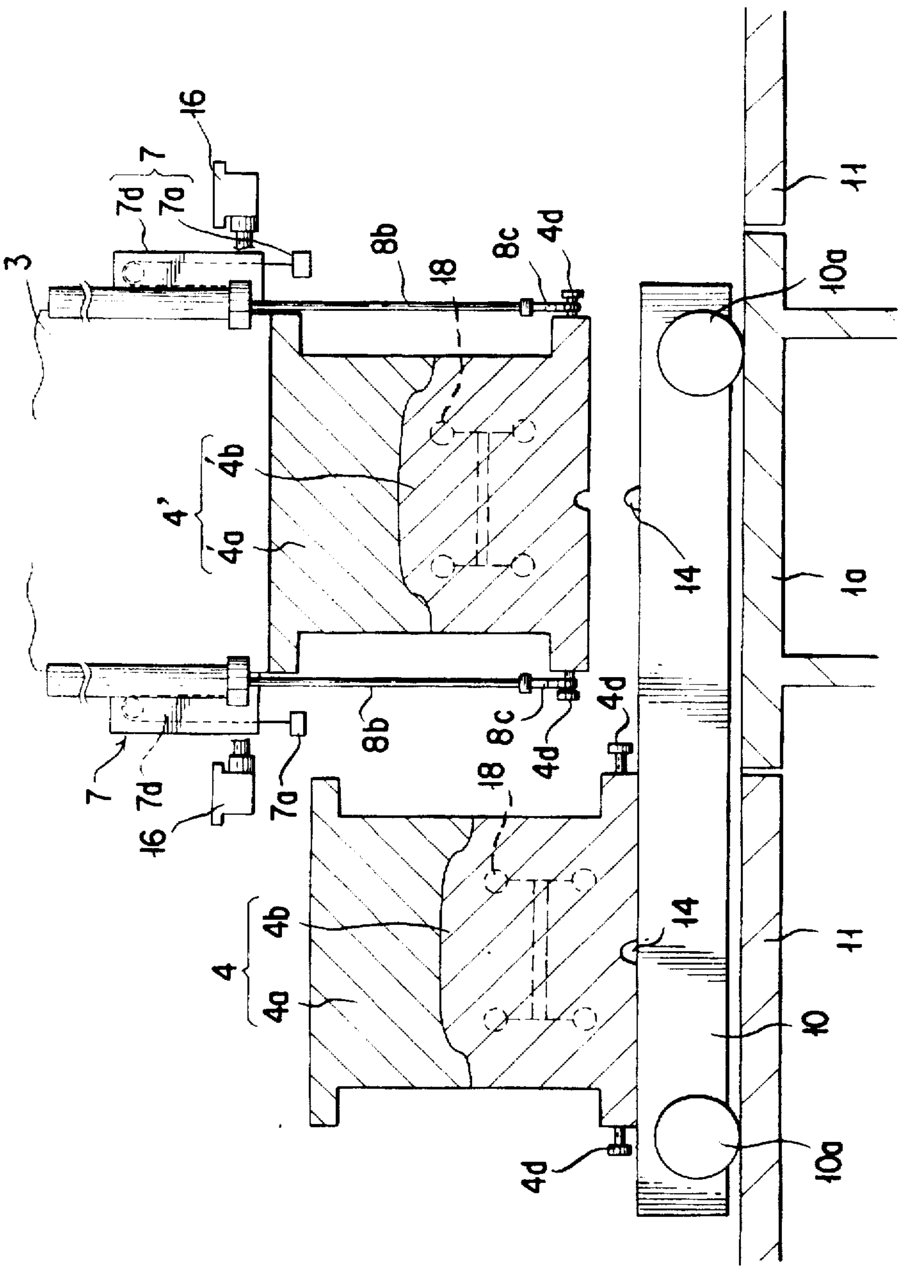

On the other hand, it is seen from FIG. 5 that numeral 10 designates a carrier vehicle for carrying die sets thereon and for transporting one or more of them therewith. It is shown there that a single carrier 10 is configured to have a space sufficient for both a die set having been used 4 and a die set to be used next 4' by the press system 1 to be mounted thereon at the same time. The said carrier vehicle 10 is provided below with wheels 10a and is self-propelled to cause these wheels 10a to run on parallel rails 11 which are laid in a forth and back direction of the press system 1 (in a direction that is orthogonal to a feed direction) as well as parallel rails 12 which are laid to intersect the said rails 11 and laid forwards and rearwards of the press system 1, the said rails 12 having been laid to reach a die set storage site 13 that is disposed remote from (or alternatively, adjacent to) the said press system 12.

Also, on the above mentioned carrier vehicle 10, both the said die set used 4 and the said die set to be used next 4' are adequately positioned thereon by mating positioning projections 14 and 14 formed on the upper surface of the carrier vehicle 10 with positioning recesses 4c and 4'c formed in the lower surface areas of those die sets 4 and 4', respectively.

At this point it should be noted that with reference to FIG. 2, numeral 16 and 16 designate a pair of transfer bars which are disposed in a parallel relationship with respect to a workpiece feed direction and are so arranged to be displaceable in two dimensional directions, i.e. a feed direction and a lifting direction. Between these transfer bars 16 and 16 there extend a pair of cross bars 17 and 17 which are transversely suspended with a given distance in the feed direction and to which are removably attached a number of attracting members such as suction caps for a workpiece, i.e. a suction operative workpiece attracting means 18.

Also, such a suction operative workpiece attracting means 18 is here arranged so that when die sets are exchanged it may as well be exchanged as attached, e. g. to the lower die 4b of the die set 4 which is conveyed out of the interior of the press system 1.

An explanation will now be given with respect to a press die set exchanging of the present invention with reference to FIGS. 4 to 8.

Figure 4:
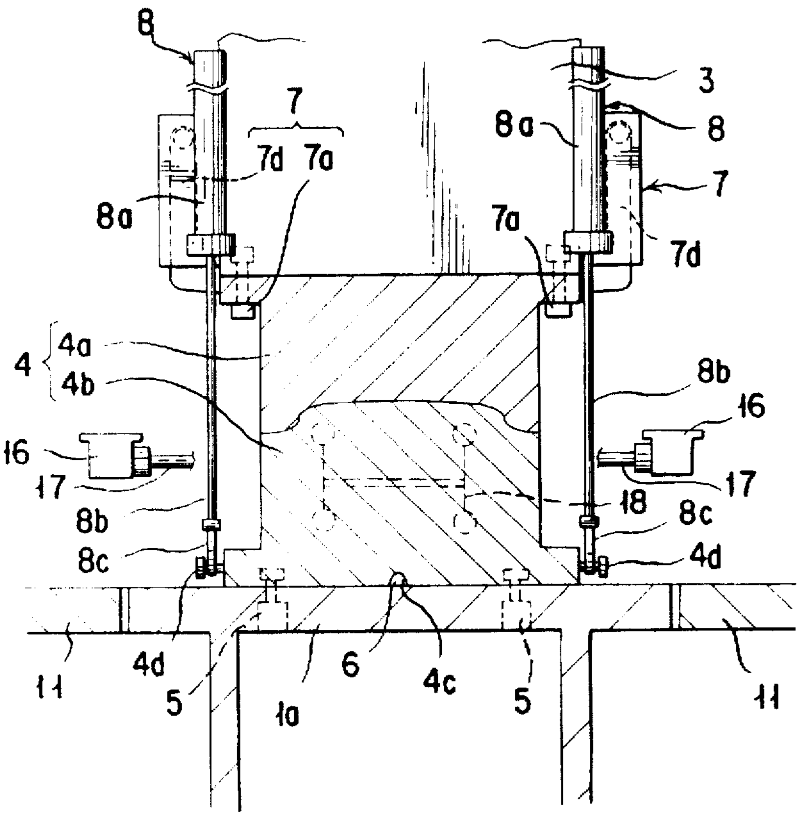
FIGS. 4 to 8 represent concrete steps showing the above mentioned first general form of embodiment of the present invention.

When a press forming operation has been completed using a die set 4 received within the interior of thę press system 1, the slide 3 will be lowered as shown in FIG. 4 to mount the upper die 4a upon the lower die 4b that is securely fixed to the press bed 1a. Under this state, the upper die clamp units 7 and the lower die dampers 5 will each be brought into a released condition.

Also, the transfer feeder will be disengaged from the drive system for the press system 1. Then, the transfer bars 16 will be forcibly lowered by a single operation of any other drive system to allow the suction operative workpiece attractive means 18 to be separated from the cross bars 17 and in turn to be held by the die set 4. Thereafter, the transfer bars 16 will be forcibly lifted up until it reaches a position where it may not interfere with the die set 4 when it is withdrawn or when it is entered.

Next, the respective piston rods 8b and 8b of the two die holders 8 that are mounted to the slide 3 will be extended to allow the grasping mechanisms 8c to grasp the suspension hooks 4d, respectively, of the lower die 4b. Thereafter, the slide 3 will be lifted up as shown in FIG. 5 to suspend up the die set 4 to provide a spacing D between the bottom surface of the lower die 4b and the upper surface of the press bed 1a through which the carrier vehicle 10 may be admitted.

And, it is in this state that a said carrier vehicle 10 having a die set to be used next 4' mounted thereon which has been held at a standby state either forwards or rearwards of the press system 1 will be transported into the interior of the press system 1 and then stopped at a fixed site therein.

Next, the slide 3 will be lowered and, if the used die set 4 is shifted onto the carrier vehicle 10, the two die holders 8 and 8 will be actuated at their respective actuator cylinders 8d to bring their respective grasping mechanisms 8c into a released condition and at their respective hydraulic cylinders 8a to bring their respective grasping mechanism 8c to their uppermost position. At the same time, the slide 3 will be lifted up to allow the upper die 4a to be dislodged therefrom.

And, it is in this state that the carrier vehicle 10 is further displaced until the die set to be used next 4' thereon reaches a predetermined position below the slide 3. Then, the carrier vehicle 10 will be stopped and the slide 3 will be lowered again. At the same time, the respective grasping mechanisms 8c of the die holders 8 will be lowered. They will then be actuated to grasp the suspension hooks 4d of the die set to be used next 4' on the carrier vehicle 10 and in this state the slide 3 will be lifted up to suspend up the die set to be used next 4' from the upper surface of the carrier vehicle 10.

Figure 7:
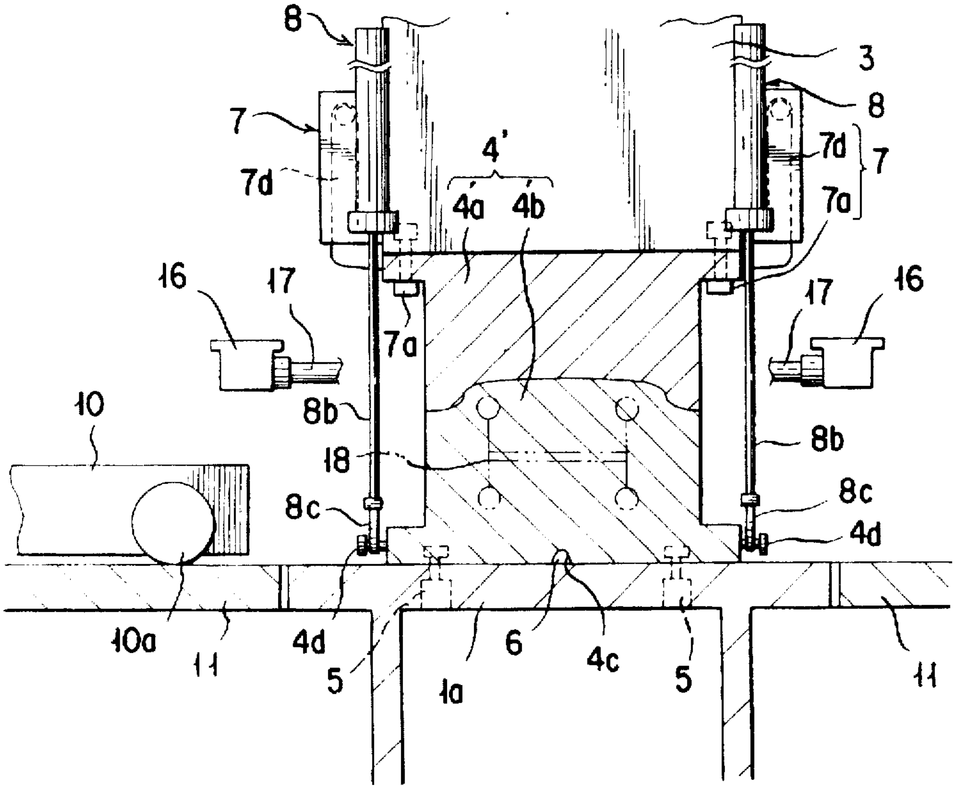

It follows next that the carrier vehicle 10 having the die set used 4 still mounted thereon meanwhile will be transported out of the interior of the press system 1 into the die set storage site 13 where the said die set used 4 will be dislodged. Then, within the press system 1, the slide 3 will be lowered as shown in FIG. 7 to allow the bottom surface of the lower die 4b to land on the press bed 1a and the die holders 8 with their respective grasping mechanisms 8c each in a released condition will be lifted to their uppermost position.

And it is in this state that the upper die clamp units 7 will act to securely fix the upper die 4'a of the die set to be used next 4' to the lower surface of the slide 3 whereas the lower die dampers 5 will be used to securely fix the lower die 4'b upon the press bed 1a and that the transfer bars 16 will be forcibly lowered to allow the cross bars 17 to be coupled with the suction operative workpiece attractive means 18 that has been held by the die set to be used next 4' and has now been introduced therewith and will thereafter be lifted up to a fixed position.

Figure 8:
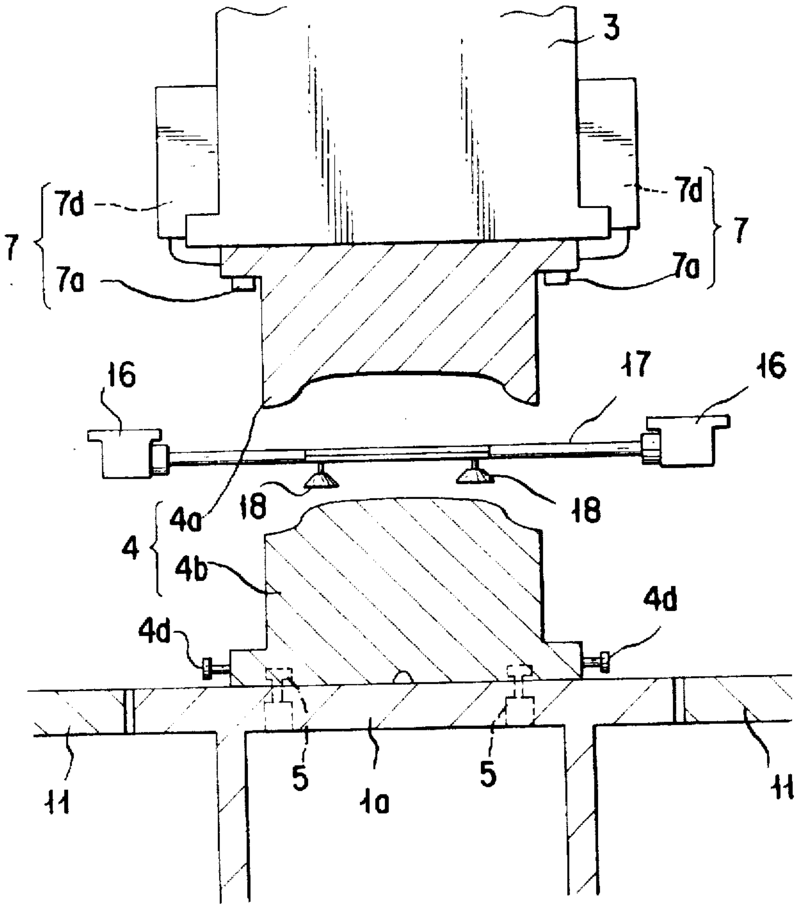

Next, from this state the slide 3 will be lifted up as shown in FIG. 8 to separate the upper die 4a from the lower die 4b. Thereafter, the drive system for the press system 1 and the transfer feeder are coupled together to initiate a press forming operation.

According to the present embodiment of the invention in which press die sets are exchanged by using a carrier vehicle 10, as configured as discussed in the foregoing, in such a manner that a die set 4 having been used by a press system 1 may be conveyed out of an interior thereof and a die set 4' to be used next by the press system 1 may be conveyed into the interior thereof, it can be seen that it has become possible to exchange die sets in a press system without having to use one or more moving bolsters as in the prior art.

Since the press system 1 can thereby be reduced in its total height by the height of a moving bolster, it can be seen that the present embodiment will enable the press system 1 to be enhanced in its rigidity and, as a result, a press forming operation to be performed with an increased accuracy while allowing a building in which the entire press system 1 is installed to be reduced in its total height, thus providing for remarkably enhanced economical results.

Also, the present embodiment of the invention thus makes it unnecessary to provide a large sized and heavy weighted moving bolster as well as such accessory facilities associated therewith as a means for displacing it up and down within the interior of the press system 1 and a means for clamping it to a bed 1*a* of the press system 1. As will readily be appreciated, this is able to largely reduce the entire cost of the press system and to bring about a marked improvement in its rigidity which in turn results in a reduction of possible vibrations during press forming operations and a diminishing of their accompanying noises.

Also, the ability to securely hold a press die 4 directly upon a press bed 1*a*, which represents another important advantage here, will ensure that any scrap which may evolve there can be exhausted through a scrap discharge outlet if formed therein, with which any scrap can readily be exhausted outside without resorting on a scrap shoot or the like.

Furthermore, the ability to transport a die set 4 on a carrier vehicle 10 to a die set storage site which represents a still further important advantage here, will ensure an operation of die set exchange which can be carried out on a full automatic basis by providing a die set exchange unit at the die set storage site.

And yet, by virtue of the fact that during a press forming operation a carrier vehicles 10 should lie outside of the interior of the press system 1, thus making it unnecessary to hold it like a moving bolster in the interior of the press system, it is seen that any problem such as the inconvenience previously encountered that during the press forming operation a coolant or lubricating oil as would have been adherent to the moving bolster may drop on a path of travel thereof and may thus contaminate it will be effectively resolved.

Figure 9:
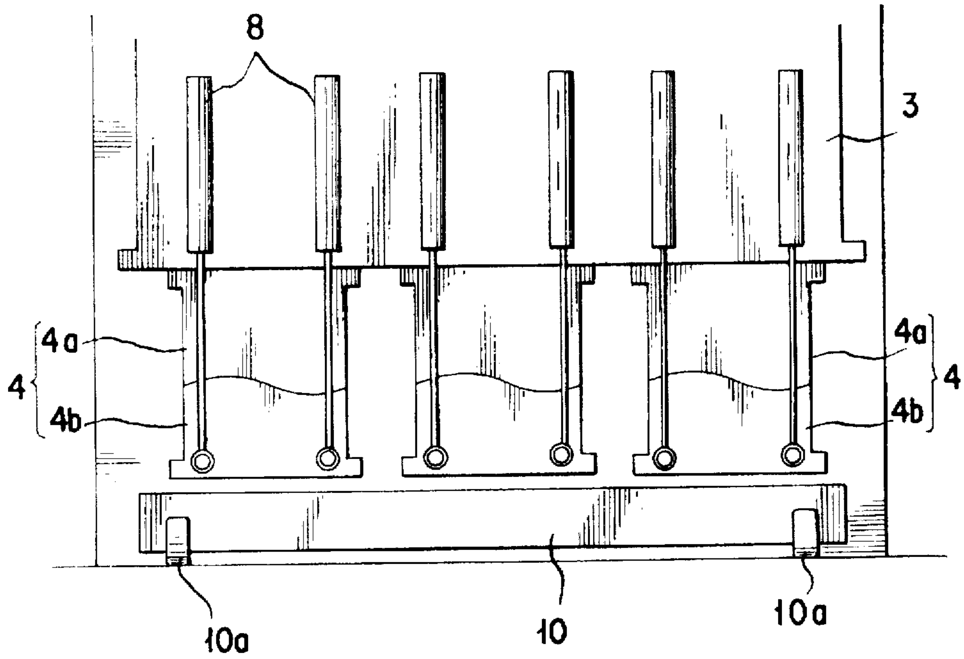
FIG. 9 is an explanatory view showing a modification of the above mentioned first general form of embodiment of the present invention.

While an explanation has been given in the foregoing embodiment with respect to the case in which a carrier vehicle 10 is configured to have both a single die set having been used 4 and a single die set to be used next 4' mounted thereon, if it is desired to exchange a plurality of die sets having been used 4 with a plurality of die sets to be used next 4' at the same time, this demand can be met by using a configuration as shown in FIG. 9 in which a carrier vehicle 10 having a plurality of die sets having been used 4 preliminarily mounted thereon is transported into the interior of the press system 1 and then adopting the above mentioned exchanging method in which they may be exchanged at the same time.

It should also be noted that in a transfer press system having a plurality of pressing stations, for example, a first station is designed to perform a draw forming operation.

Figure 10:
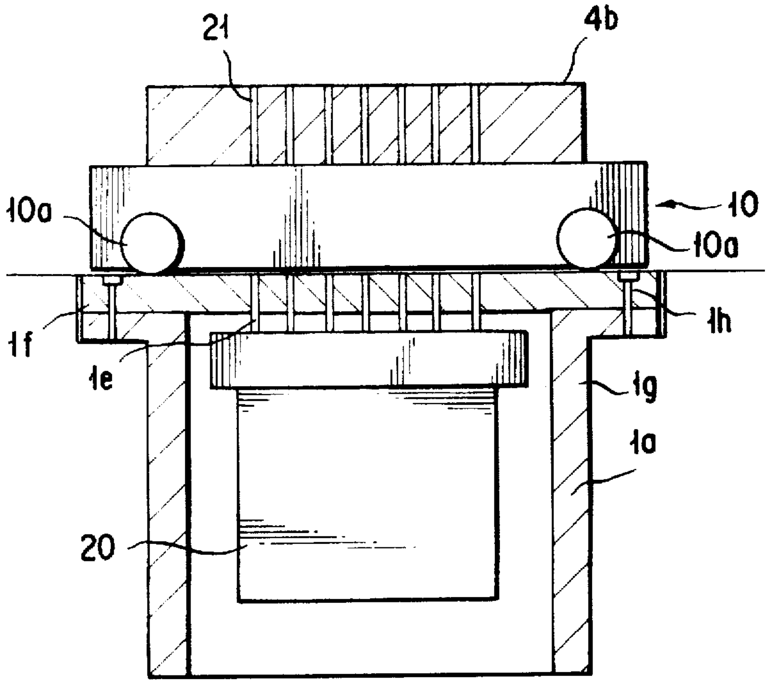
FIG. 10 is a cross sectional view showing a modified example of a first station of a transfer press system.

In this case, the first station is customarily provided with a die cushion as shown 20 in FIG. 10. Since then a portion of the lower die 4*b* is adapted to be supported by resilience from the lower side via a plurality of cushioning pins 21, the press bed 1*a* needs to be formed with a plurality of pin holes 1*e* through which the pins 21 are penetrated.

It is, however, extremely laborious to form such pin holes 1*e* in a large sized press bed 1*a*. In order to meet this difficulty, the press bed 1*a* is here constituted of a divided structure as comprising a bed upper plate if and a lower supporting portion 1*g* which are coupled together by a number of connecting members 1*h*. Then, if the pin holes 1*e* are to be formed through the bed upper plate If mounted upon the lower supporting portion 1*g*, it can be seen that the required machining process will be facilitated, and yet made possible so as to yield an increased machining precision.

Figure 11:
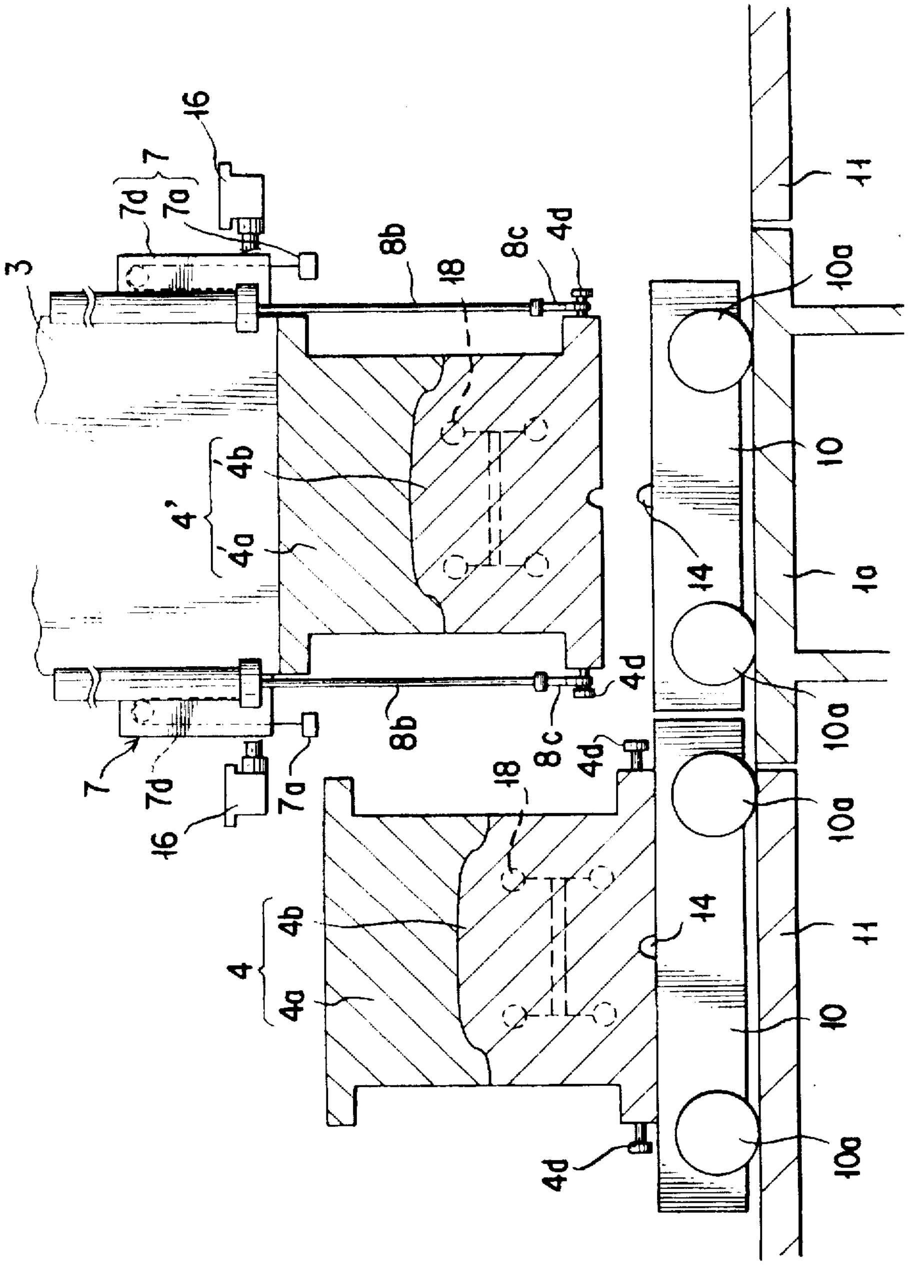
FIG. 11 is a cross sectional of a transfer press which incorporates another embodiment of the die set exchanging method according to the present invention.

It should further be noted here that while the foregoing embodiment has been set forth with respect to a press die exchange that is is carried out by using such a single carrier vehicle 10 as with a space that is capable of having both a die set having been used 4 and a die set to be used next 4' mounted on the same carrier vehicle 10 at the same time, it is also possible to make use of a pair of carrier vehicles 10 as shown in FIG. 11 that represents another embodiment of the present invention, for performing the required press die set exchange.

In this case, the pair of carrier vehicles 10 are adapted to have a die set having been used 4 and have a die set to be used next 4' mounted, respectively, thereon. The die set exchange as required may then be carried out by conveying the used die set 4 out of a forward or a rearward region of the press system 1 and then conveying the die set to be used next 4' into a rearward or a forward region of the press system.

Finally, it should be noted that while various embodiments have been hereinbefore set forth with respect to a transfer press system that is equipped with a suction operative workpiece attractive and transfer feeder, the system may be of a two dimensional or three dimensional transfer press in which a workpiece or workpieces can be clamped by means of finger members. Even more important is it that the present invention should be applicable to a general or any press system.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A method of exchanging die sets in a press system, comprising the steps of:

establishing a state in which a die set having been used by the press system is held with a die holder provided to a slide of the press system and is lifted by said slide;

in said state, transporting into an interior of the press system a carrier vehicle having a first space in which a die set to be used next by the press system having been mounted and a second space capable of accepting said used die set for mounting on said carrier vehicle;

dislodging said used die set from said slide and mounting it on said carrier vehicle;

thereafter, displacing said carrier vehicle to such a place that said die set to be used next may be kept located below said slide;

establishing a state in which said die set to be used next is held by said die holder and is lifted up by said slide;

thereafter, transporting out of the interior of the press system said carrier vehicle having said used die set mounted thereon; and thereafter, lowering said slide, and securing a lower die and an upper die of said die set to be used next, upon a bed of said press system and to a lower surface of said slide thereof, respectively.

2. A method of exchanging die sets in a press system, as set forth in claim 1, wherein a plurality of die sets having been used are exchanged for a plurality of die sets to be used next, respectively, at the same time.

* * * * *